United States Patent
Kwatra et al.

(10) Patent No.: US 12,028,224 B1
(45) Date of Patent: Jul. 2, 2024

(54) CONVERTING AN ARCHITECTURE DOCUMENT TO INFRASTRUCTURE AS CODE

(71) Applicant: INTERNATIONAL BUSINESS MACHINES CORPORATION, Armonk, NY (US)

(72) Inventors: Shikhar Kwatra, San Jose, CA (US); Sushain Pandit, Austin, TX (US); Indervir Singh Banipal, San Jose, CA (US); Richard Daniel Gunjal, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/111,047

(22) Filed: Feb. 17, 2023

(51) Int. Cl.
| | |
|---|---|
| *G06F 15/16* | (2006.01) |
| *G06F 40/30* | (2020.01) |
| *G06T 7/11* | (2017.01) |
| *G06T 11/20* | (2006.01) |
| *H04L 41/00* | (2022.01) |
| *H04L 41/084* | (2022.01) |
| *H04L 41/12* | (2022.01) |

(52) U.S. Cl.
CPC .............. *H04L 41/20* (2013.01); *G06F 40/30* (2020.01); *G06T 7/11* (2017.01); *G06T 11/206* (2013.01); *H04L 41/084* (2013.01); *H04L 41/12* (2013.01)

(58) Field of Classification Search
CPC ....... H04L 41/20; H04L 41/084; H04L 41/12; G06T 7/11; G06T 11/206; G06F 40/30
USPC .......................................................... 709/222
See application file for complete search history.

(56) References Cited

U.S. PATENT DOCUMENTS

| | | | |
|---|---|---|---|
| 8,601,265 B2 * | 12/2013 | Mane ..................... | H04L 9/3234 |
| | | | 713/180 |
| 9,055,052 B2 * | 6/2015 | Mane .................. | H04L 63/0869 |
| 10,564,987 B1 * | 2/2020 | Lépine ................ | G06F 9/44505 |
| 10,805,154 B2 * | 10/2020 | D'Onofrio ................ | G06F 8/65 |

(Continued)

FOREIGN PATENT DOCUMENTS

| | | |
|---|---|---|
| CN | 113127645 | 7/2021 |
| JP | 2011123917 | 6/2011 |

(Continued)

OTHER PUBLICATIONS

Imam, "Application of Ontologies in Cloud Computing: The State-Of-The-Art", Oct. 6, 2016, 13 pages.

(Continued)

*Primary Examiner* — Alicia Baturay
(74) *Attorney, Agent, or Firm* — Jared Chaney; Andrew D. Wright; Calderon Safran & Wright, P.C.

(57) ABSTRACT

A method includes: receiving, by a processor set, a cloud architecture document; converting, by the processor set, the cloud architecture document to a graph including nodes; determining, by the processor set, cloud environment information for the nodes by analyzing textual content of the nodes using natural language processing; determining, by the processor set, additional cloud environment information for the nodes using domain ontology data; and creating, by the processor set, an Infrastructure as Code (IaC) document based on the cloud environment information and the additional cloud environment information.

20 Claims, 7 Drawing Sheets

(56) References Cited

U.S. PATENT DOCUMENTS

| | | | |
|---|---|---|---|
| 10,924,559 B1* | 2/2021 | Kubik | H04L 12/1403 |
| 10,999,162 B1* | 5/2021 | Welch | H04L 67/10 |
| 11,061,739 B2* | 7/2021 | Staffelbach | G06F 8/65 |
| 11,163,544 B2* | 11/2021 | Lee | G06F 9/5061 |
| 11,308,505 B1* | 4/2022 | Newman | G06F 16/288 |
| 11,347,559 B2* | 5/2022 | Hashimoto | G06F 9/5072 |
| 11,418,415 B2* | 8/2022 | Welch | H04L 41/5019 |
| 11,556,238 B1* | 1/2023 | Kairali | G06F 9/451 |
| 11,595,266 B2* | 2/2023 | Kavadimatti | H04L 67/1097 |
| 11,669,371 B2* | 6/2023 | Masek | G06F 9/5077 |
| | | | 718/104 |
| 11,669,430 B2* | 6/2023 | Suzuki | G06F 11/3051 |
| | | | 714/37 |
| 11,829,234 B2* | 11/2023 | Mohanty | G06F 9/5038 |
| 2014/0122577 A1* | 5/2014 | Balasubramanian | |
| | | | H04L 67/148 |
| | | | 709/203 |
| 2016/0149769 A1* | 5/2016 | Joshi | H04M 15/8016 |
| | | | 715/739 |
| 2017/0012854 A1* | 1/2017 | Balasubramanian | H04L 43/50 |
| 2019/0079750 A1* | 3/2019 | Foskett | G06F 9/5072 |
| 2019/0268461 A1 | 8/2019 | Ai | |
| 2020/0012480 A1* | 1/2020 | Rizo | G06F 21/577 |
| 2020/0210911 A1 | 7/2020 | Kim et al. | |
| 2020/0387357 A1* | 12/2020 | Mathon | G06F 9/4411 |
| 2021/0359920 A1* | 11/2021 | Welch | H04L 41/5045 |
| 2022/0052910 A1* | 2/2022 | Neelakantam | G06F 11/2071 |
| 2022/0300340 A1* | 9/2022 | Cardenas | G06F 9/505 |
| 2022/0308929 A1* | 9/2022 | Oluyemi | G06F 16/51 |
| 2022/0353289 A1* | 11/2022 | Witschey | G06F 9/44505 |
| 2023/0188434 A1* | 6/2023 | Welch | H04L 41/5019 |
| | | | 709/223 |
| 2023/0282350 A1* | 9/2023 | Devore | G16H 50/30 |
| | | | 705/2 |

FOREIGN PATENT DOCUMENTS

| | | | | |
|---|---|---|---|---|
| JP | 5209073 | | 6/2013 | |
| TW | 201545058 | | 12/2015 | |
| TW | I567646 | | 1/2017 | |
| WO | WO-2020182413 A1 | * | 9/2020 | |
| WO | WO-2023217396 A1 | * | 11/2023 | G06F 11/3664 |

OTHER PUBLICATIONS

Uchegbu, "Infrastructure as code with Ansible", https://birdeatsbug.com/blog/infrastructure-as-code-with-ansible, Aug. 30, 2022, 9 pages.

Anonymous, "What is Infrastructure as Code (IaC)?", https://www.redhat.com/en/topics/automation/what-is-infrastructure-as-code-iac, May 11, 2022, 9 pages.

Strutt, "Infrastructure as Code: Chef, Ansible, Puppet, or Terraform?", https://www.IBM.com/cloud/blog/chef-ansible-puppet-terraform, Nov. 13, 2018, 6 pages.

Chaudhri et al., "A Case Study in Bootstrapping Ontology Graphs from Textbooks", 2021, 31 pages.

C. Leena et al., "Generating Graph from 2D Flowchart using Region-Based Segmentation", 2020, 5 pages.

Anonymous, "Watson Natural Language Understanding", IBM Cloud, Archived on Feb. 10, 2023, 8 pages.

Anonymous, "SystemT", https://researcher.watson.IBM.com/researcher/view_group.php?id=1264, Archived on Feb. 10, 2023, 5 pages.

Anonymous, "Using the rule-based model", https://cloud.IBM.com/docs/watson-knowledge-studio?topic=watson-knowledge-studio-wks_rule_publish, Archived on Feb. 10, 2023, 8 pages.

* cited by examiner

CONVERTING AN ARCHITECTURE DOCUMENT TO INFRASTRUCTURE AS CODE

BACKGROUND

Aspects of the present invention relate generally to cloud computing and, more particularly, to provisioning and deploying cloud computing resources using Infrastructure as Code.

Cloud computing architecture refers to the components and subcomponents required for a cloud platform which may include, but is not limited to, storage, accessibility, software capabilities, applications, hybrid cloud components including on-premises components, middleware, and other cloud resources. A cloud architecture document or diagram is often used to facilitate a user, such as a cloud operator, in setting up and configuring the components of the cloud computing platform. The cloud architecture document may visually depict the cloud components/sub-components and the relationships between them.

SUMMARY

In a first aspect of the invention, there is a computer-implemented method including: receiving, by a processor set, a cloud architecture document; converting, by the processor set, the cloud architecture document to a graph including nodes; determining, by the processor set, cloud environment information for the nodes by analyzing textual content of the nodes using natural language processing; determining, by the processor set, additional cloud environment information for the nodes using domain ontology data; and creating, by the processor set, an Infrastructure as Code (IaC) document based on the cloud environment information and the additional cloud environment information.

In another aspect of the invention, there is a computer program product including one or more computer readable storage media having program instructions collectively stored on the one or more computer readable storage media. The program instructions are executable to: receive a cloud architecture document comprising a diagram with a visual representation of components in a cloud computing environment; convert the cloud architecture document to a graph including nodes; determine cloud environment information for the nodes by analyzing textual content of the nodes using natural language processing; determine additional cloud environment information for the nodes using domain ontology data; and create an Infrastructure as Code (IaC) document based on the cloud environment information and the additional cloud environment information, wherein the IaC document comprises machine-readable code that is executable to provision resources in the cloud computing environment according to the cloud architecture document.

In another aspect of the invention, there is a system including a processor set, one or more computer readable storage media, and program instructions collectively stored on the one or more computer readable storage media. The program instructions are executable to: receive a cloud architecture document comprising a diagram with a visual representation of components in a cloud computing environment; convert the cloud architecture document to a graph including nodes; determine cloud environment information for the nodes by analyzing textual content of the nodes using natural language processing; determine additional cloud environment information for the nodes using domain ontology data; create an Infrastructure as Code (IaC) document based on the cloud environment information and the additional cloud environment information, wherein the IaC document comprises machine-readable code that is executable to provision resources in the cloud computing environment according to the cloud architecture document; and create a playbook based on the IaC document.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
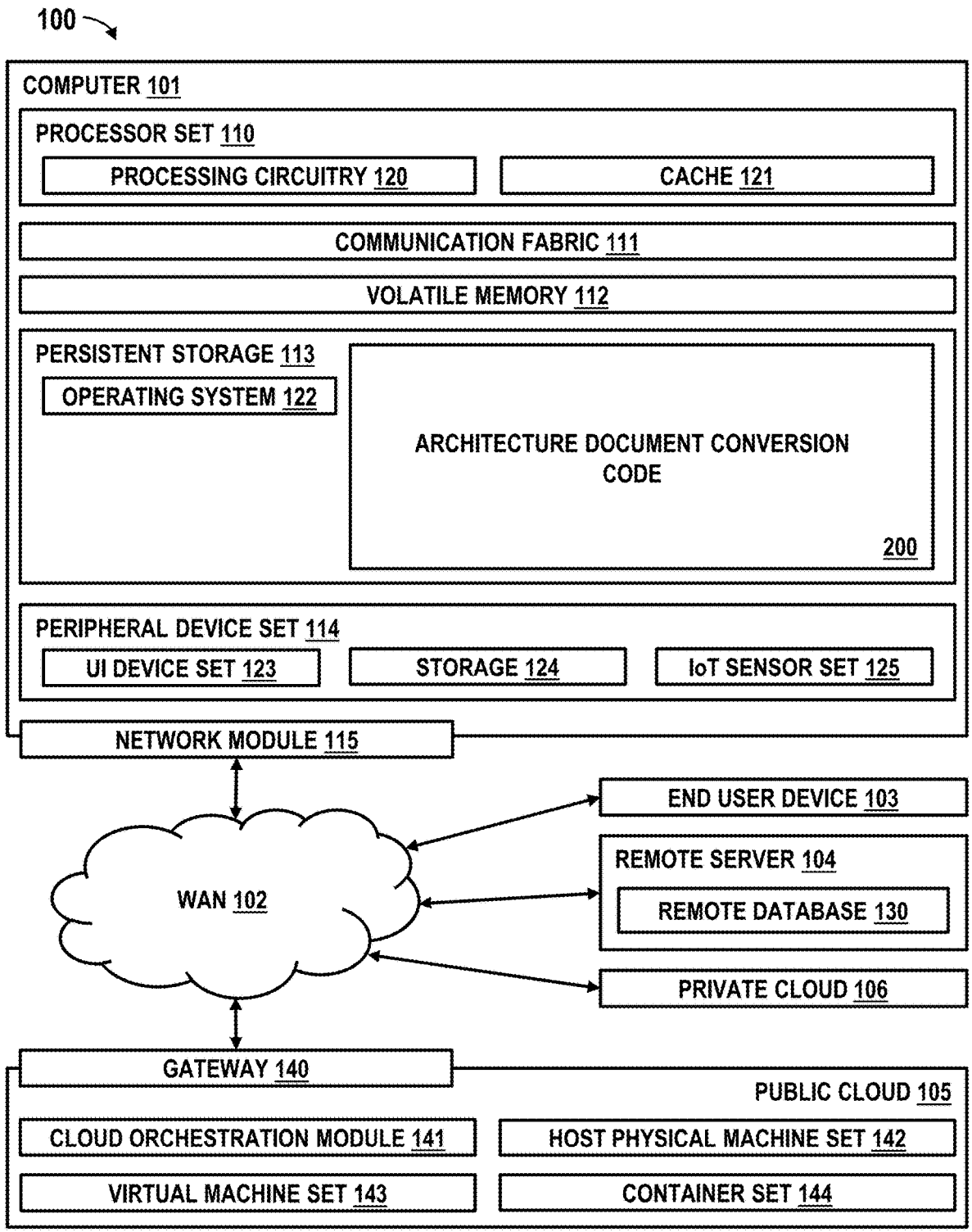
FIG. 1 depicts a computing environment according to an embodiment of the present invention.

Aspects of the present invention relate generally to cloud computing and, more particularly, to provisioning and deploying cloud computing resources using Infrastructure as Code. Prior to the advent of cloud computing, managing a server for a client was a full-time job for a system administrator. Managing a server in this context included carefully curating critical systems of the server to ensure that these systems provided the desired functionalities to the client smoothly and without interruption. With the advent of cloud computing, much of the work of operating and maintaining servers has been moved to cloud service providers. Infrastructure as Code (IaC) is a methodology by which engineers define the computer systems that their code needs for execution. In this methodology, engineers may use an architecture document to define components, functions, requirements, and relationships needed to run one or more applications, and the IaC comprises machine-readable instructions that are executable to implement what is defined in the architecture document.

Current implementations of the IaC methodology involve a user manually converting the architecture document to the IaC. For example, when deploying a cloud solution based on an architecture document, a cloud operator visually inspects and comprehends the depictions and relationships in the architecture document and manually writes code (e.g., the IaC) to implement what is defined in the architecture document. In other words, a user must manually configure settings for and interconnect the cloud components such as storage, a virtual network, applications, capabilities, and other various components. The process can take the user a significant amount of time.

Implementations of the invention address this problem with the conventional methodology by providing a method, system, and computer program product that automatically converts a cloud architecture document to IaC. Embodiments convert the cloud architecture document to a graph structure using region-based segmentation, using natural language processing (NLP) to determine cloud environment information specified in nodes of the graph structure, and using a machine learning (ML) model to determine predefined code modules for inclusion in the IaC. Automatically converting the architecture document to IaC provides an improvement in the technological field of cloud computing by eliminating or greatly reducing the amount of user time involved in manually coding the IaC. The improvement is technological is nature because it involves utilizing computer-based techniques such as region-based segmentation, natural language processing, and machine learning.

As will be understood from the present disclosure, aspects of the invention provide a method that includes: generating a graph from a two dimensional flowchart using region-based segmentation, wherein the textual contents of the flowchart nodes are processed using rule-based NLP models based understanding; receiving a cloud-oriented domain ontology from a publicly sourced knowledge base; generating constructs and rules based on the graph and the publicly sourced knowledge base discovering, for a node in the graph based on the rules, a governing node in the ontology/knowledge base that matches the node; and validating that the adjacent nodes to the node cover any additional related constraints (SLAs in this instance), and there are no exclusions.

Embodiments of the invention enhance the deployment of architecture diagrams which are converted to code (application or infrastructure) using a machine learning framework to identify versions, provisions for specific release by enabling the development, and test teams to improve the quality of the non-functional features of the overall enterprise applications. Embodiments include systems and methods to dynamically generate varied playbooks to build a pipeline from architecture diagrams for multi cloud deployments. Embodiments include systems and method to use enterprise ontologies and semantic graphs to associate domain-specific constructs and rules when generating the playbooks in order to validate (e.g., rule-check) that the infrastructure definitions remain sound.

It should be understood that, to the extent implementations of the invention collect, store, or employ personal information provided by or obtained from individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as architecture document conversion code shown at 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
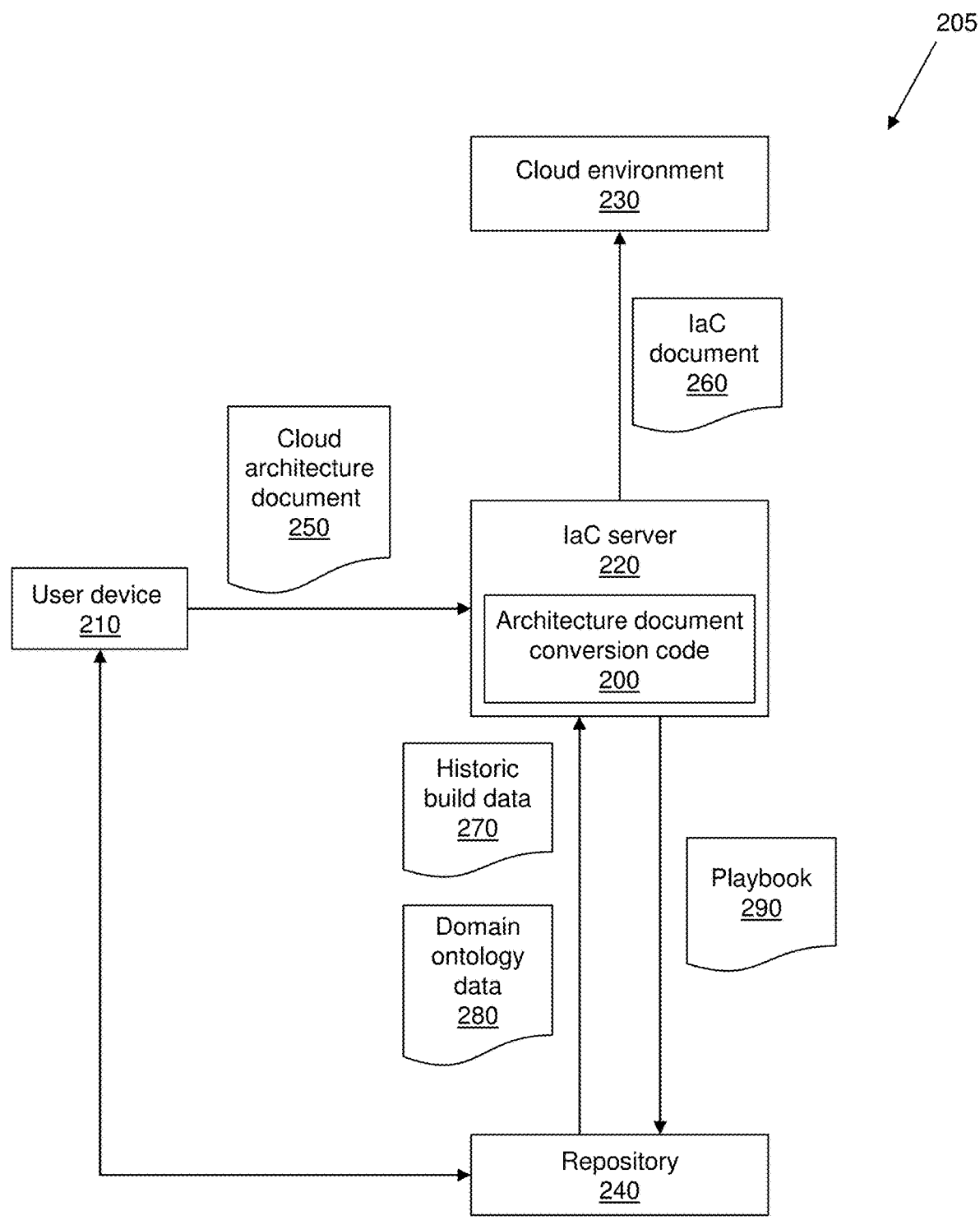
FIG. 2 shows a block diagram of an exemplary environment in accordance with aspects of the present invention.

FIG. 2 shows a block diagram of an exemplary environment 205 in accordance with aspects of the invention. In embodiments, the environment 205 includes a user device 210, IaC server 220, cloud environment 230, and repository 240. In one exemplary implementation, the user device 210 comprises one or more instances of the end user device 103 of FIG. 1, the cloud environment 230 comprises public cloud 105 of FIG. 1, and the repository 240 comprises one or more instances of remote database 130 of FIG. 1. In this exemplary implementation, the IaC server 220 comprises one or more instances of the computer 101 of FIG. 1, or one or more virtual machines or containers running on one or more instances of the computer 101 of FIG. 1. In this exemplary implementation, the user device 210 communicates with the IaC server 220 and the repository 240 using a network such as the WAN 102 of FIG. 1, and the IaC server 220 communicates with the cloud environment 230 and the repository 240 using a network such as the WAN 102 of FIG. 1. In one example, the IaC server 220 is included in the cloud environment 230. In another example, the IaC server 220 is separate from the cloud environment 230.

In embodiments, the IaC server 220 of FIG. 2 comprises the architecture document conversion code 200 of FIG. 1, which is executable by the IaC server 220 (e.g., via the processing circuitry 120 of FIG. 1) to perform the inventive methods as described herein. The IaC server 220 may include additional code beyond that shown in FIG. 2. In embodiments, separate code modules may be integrated into a single module. Additionally, or alternatively, a single code module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

Still referring to FIG. 2, in accordance with aspects of the invention, the IaC server 220 receives a cloud architecture document 250 from the user device 210. In embodiments, the cloud architecture document 250 includes various components which are visually depicted therein. The components may include devices, applications, networks, virtual environments, and the like, as well as relationship lines and descriptions. In one example, the user device 210 uploads the completed cloud architecture document 250 to the IaC server 220. In another example, the user device 210 employs a user interface associated with the IaC server 220 to generate the cloud architecture document 250. In this example, the IaC server 220 may receive inputs by the user via the user interface and generate the cloud architecture document 250 based on the inputs. For example, the user may use an input mechanism such as a finger or mouse to drag and drop infrastructure components into the design and also type in requirements or select the requirements from a predefined list. The requirements may be used to configure networks, integrate components, restrict access, and the like. In response, the IaC server 220 may create and store the cloud architecture document 250.

In accordance with aspects of the invention, the IaC server 220 creates an IaC document 260 based on the cloud architecture document 250 and provides the IaC document 260 to the cloud environment 230. The IaC document 260 includes code (e.g., machine-readable code and/or machine-executable instructions) that can be executed to automatically configure a physical and/or virtual cloud computing environment according to the visual representation in the cloud architecture document 250. The IaC document 260 may be executed by simply opening the IaC document 260 by the host platform (e.g., the cloud environment 230) and executing the code therein. Thus, the platform can automatically configure a cloud computing environment based on the configurations set forth in the cloud architecture document 250 by executing the IaC document 260. In embodiments, and as described in greater detail herein, the IaC server 220 creates the IaC document 260 by converting the cloud architecture document 250 to a graph structure using region-based segmentation, using natural language processing (NLP) to determine cloud environment information specified in nodes of the graph structure, and using a machine learning (ML) model to determine predefined code modules for inclusion in the IaC based on the determined cloud environment information. In embodiments, and as described in greater detail herein, the IaC server 220 creates the IaC document 260 using historic build data 270 and domain ontology data 280 obtained from the repository 240.

In accordance with aspects of the invention, the IaC server 220 creates a playbook 290 based on the IaC document 260. In one example, the IaC server 220 converts the contents of the IaC document 260 to the playbook 290. In embodiments, the playbook 290 comprises one or more configuration files that specify what tasks to run on the servers of the cloud environment to implement the architecture defined in the architecture document. The playbook 290 may be created using YAML (Yet Another Markup Language), which is a human-readable data-serialization language that is commonly used for configuration files. In this manner, the playbook 290 is created in a language that is understandable by humans, so that a human user can review the playbook 290. In accordance with aspects of the invention, the IaC server 220 stores the playbook 290 in the repository 240 where it and other playbooks are accessible by one or more users via one or more instances of user device 210.

Figure 3:
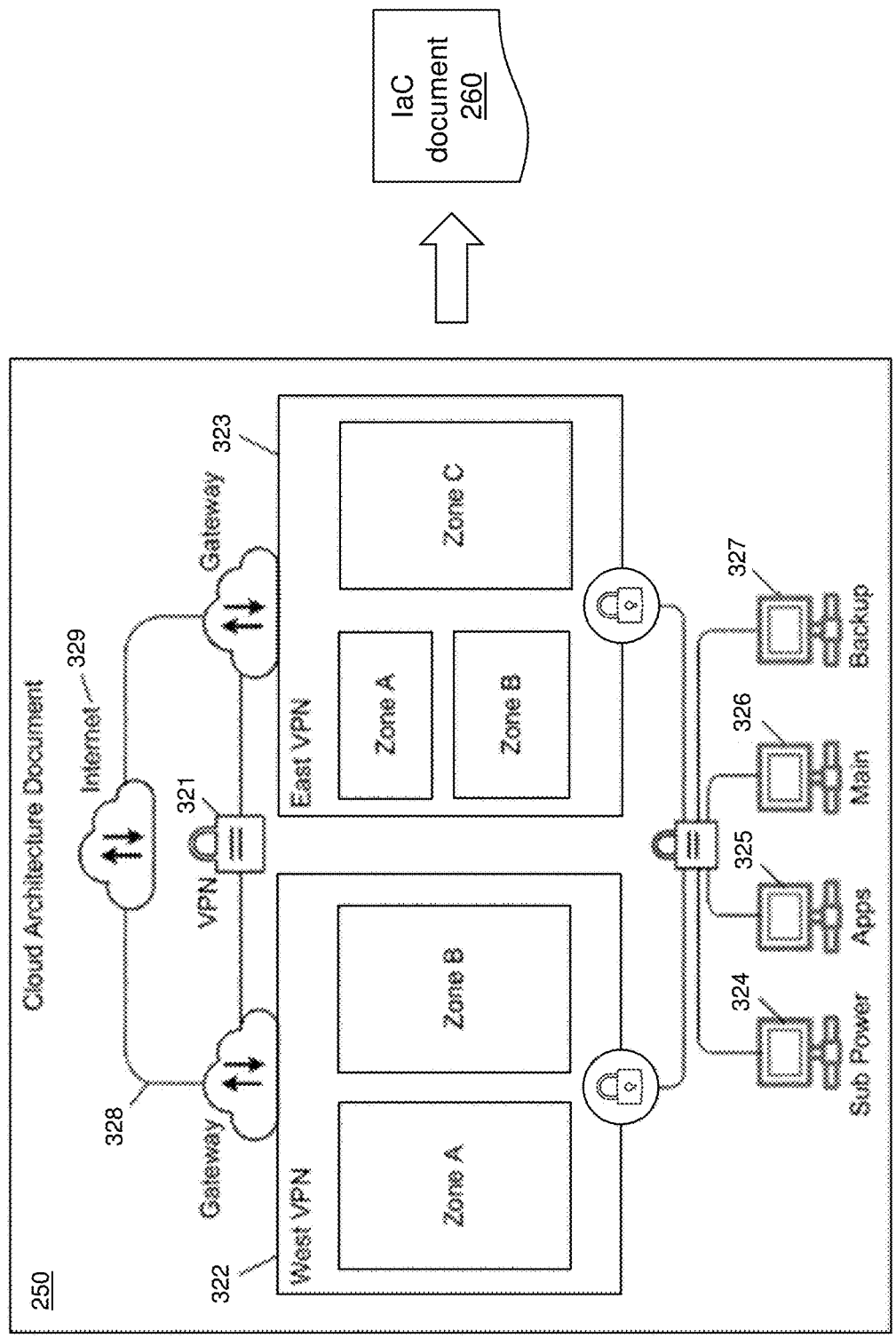
FIG. 3 illustrates a process of transforming a cloud architecture document into an IaC document that includes infrastructure as code in accordance with aspects of the present invention.

FIG. 3 illustrates a process of transforming a cloud architecture document 250 into an IaC document 260 that includes infrastructure as code according to an example embodiment. In the example of FIG. 3, the cloud architecture document 250 includes various components 321-329 which are visually depicted therein. The cloud architecture document 250 comprises a diagram that provides a visual representation of traditional cloud computing components as well as the configurations and relationships among them. The cloud architecture document 250 may be created using software such as drawio, for example. The components in the cloud architecture document 250 may include devices, applications, networks, virtual environments, and the like, as well as relationship lines 328, and descriptions 329. It should be appreciated that the design of the cloud architecture document 250 is not limited to the component types and the relationships that are shown in the example of FIG. 3. In other words, the cloud architecture document 250 shown in FIG. 3 is just one example, and other styles, formats, arrangements of components, types of components, and the like, are possible. In the process shown in FIG. 3, the IaC server 220 (of FIG. 2) creates the IaC document 260 based on the cloud architecture document 250 in the manner described herein. The IaC document 260, once created, can be executed in the cloud environment 230 (of FIG. 2) to automatically provision cloud resources in the cloud environment 230 according to the plan set forth in the cloud architecture document 250.

Figure 4:
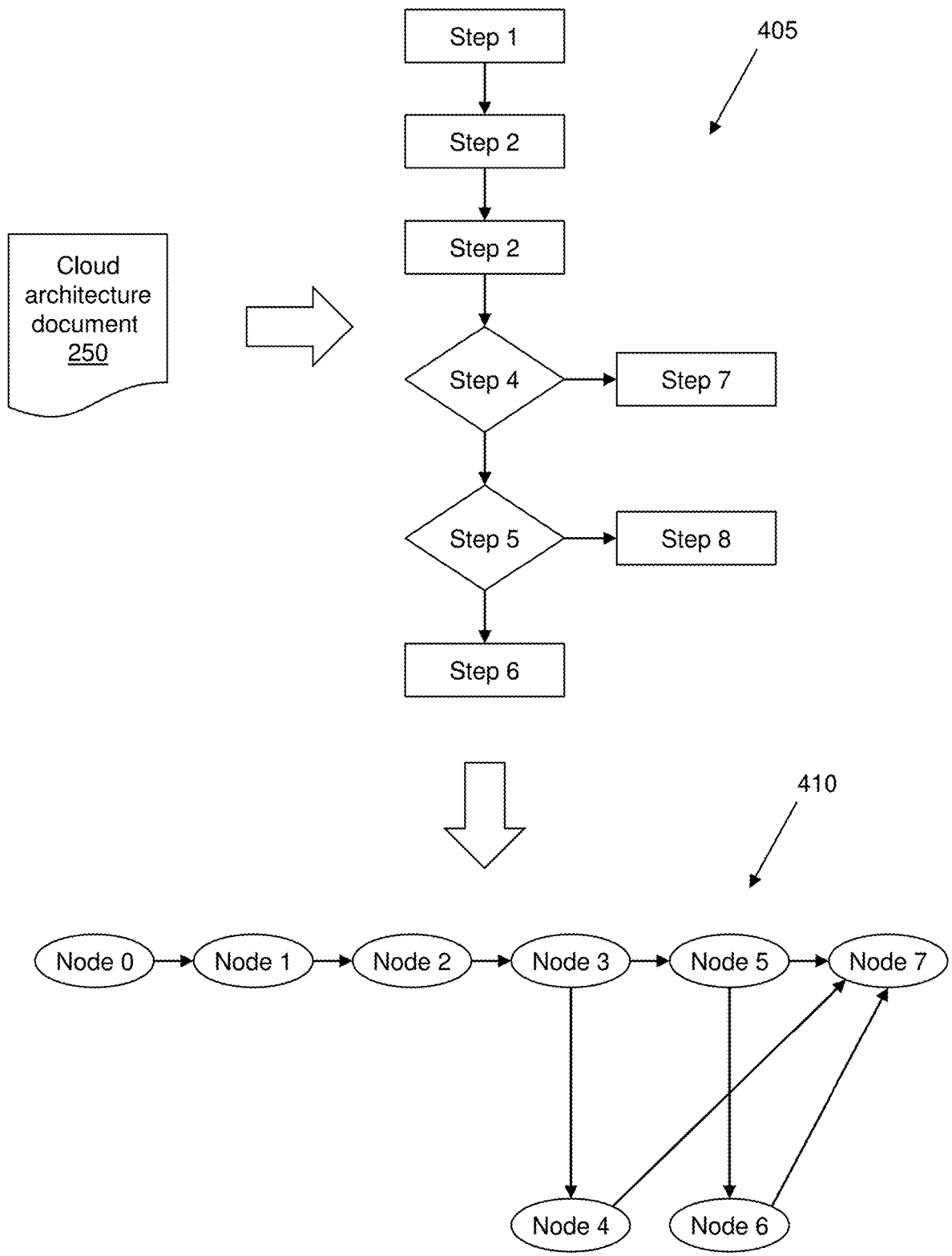
FIG. 4 shows an example of converting a cloud architecture document to a graph in accordance with aspects of the present invention.

FIG. 4 shows an example of converting a cloud architecture document to a graph in accordance with aspects of the invention. In embodiments, the architecture document conversion code 200 of the IaC server 220 (of FIG. 2) converts the cloud architecture document 250 to a flowchart 405 and converts the flowchart 405 to a graph 410. The architecture document conversion code 200 may convert the cloud architecture document 250 to the flowchart 405 using diagramming software such as drawio. In embodiments, the architecture document conversion code 200 converts the flowchart 405 to the graph 410 using region-based segmentation, which may include steps of: reading the image (e.g., the flowchart 405); pre-processing (e.g., applying Gaussian blur, thinning, and Otsu's threshold); feature extraction (e.g., segmentation (text and image), segmentation (shape and flowline), and relating shapes and flowlines); determining graph structure (e.g., node structure and edge structure); and drawing the graph (e.g., the graph 410). This results in steps of the cloud architecture document 250 (of FIG. 2) being mapped into a graph 410 that includes nodes. The flowchart 405 and graph 410 shown in FIG. 4 are exemplary and not intended to limit implementations of the invention. Different flowcharts 405 and graphs 410 will be created for different cloud architecture documents 250.

In accordance with aspects of the invention, the architecture document conversion code 200 of the IaC server 220 determines cloud environment information within each node in the graph 410. In embodiments, the architecture document conversion code 200 of the IaC server 220 determines cloud environment information for a node based on analyzing textual content of the node. For each node in the graph 410, the architecture document conversion code 200 of the IaC server 220 analyzes the textual content of the node using one or more natural language processing techniques such as natural language understanding and rule-based models. In embodiments, the architecture document conversion code 200 of the IaC server 220 trains custom rule-based models that are relevant to cloud domains including hybrid cloud domains over core (e.g., existing) semantic understanding models.

Figure 5:
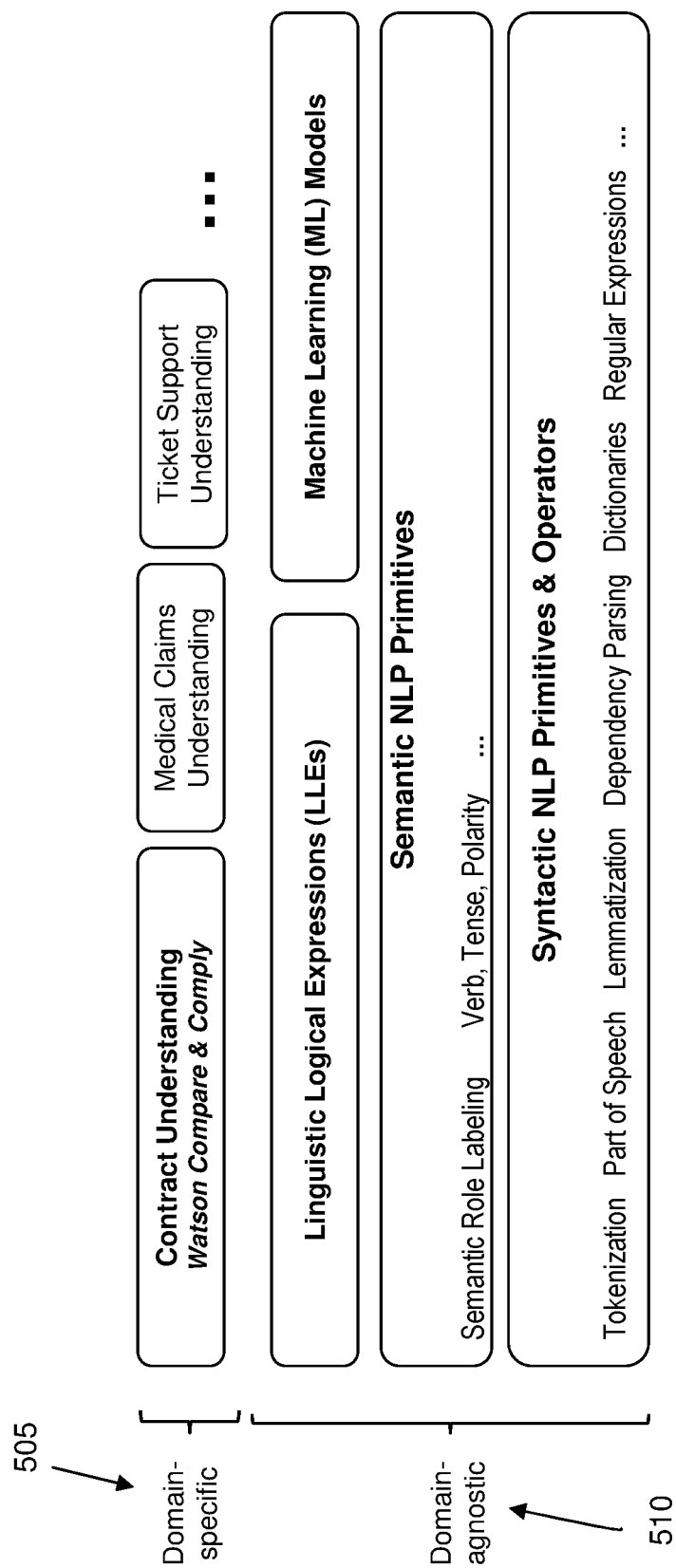
FIG. 5 shows examples of semantic understanding models that can be used to determine cloud environment information within the nodes in the graph in accordance with aspects of the present invention.

FIG. 5 shows examples of semantic understanding models that can be used to determine cloud environment information within the nodes in the graph 410 in accordance with aspects of the invention. In embodiments, the semantic understanding models include domain specific models 505 and domain general models 510. In embodiments, the domain specific models 505 are tailored to identify cloud environment information that is domain specific, i.e., specific to a particular one of different predefined cloud environments (e.g., AWS, Microsoft Azure, Google Cloud, IBM Cloud, etc.). In embodiments, the domain general models 510 are configured to identify cloud environment information that is not domain specific, i.e., not specific to any one of the different predefined cloud environments. Domain specific cloud environment information may include ontology classes and subclasses such as SLA (service level agreement), storage size, network bandwidth, and data speed, to name but a few examples. In embodiments, the content understanding at this stage is useful in defining the node details for the graph 410, which may be used in future processing to perform cloud related actions to tie the pieces together in an orderly manner during deployment.

In accordance with aspects of the invention, the architecture document conversion code 200 of the IaC server 220 determines domain specific constructs and rules associated with the domain specific cloud environment information determined for respective nodes of the graph 410. In embodiments, for each node for which domain specific cloud environment information was identified (e.g., using the semantic understanding models), the architecture document conversion code 200 uses domain ontology data to determine domain specific constructs and rules associated with the domain specific cloud environment information.

Figure 6:
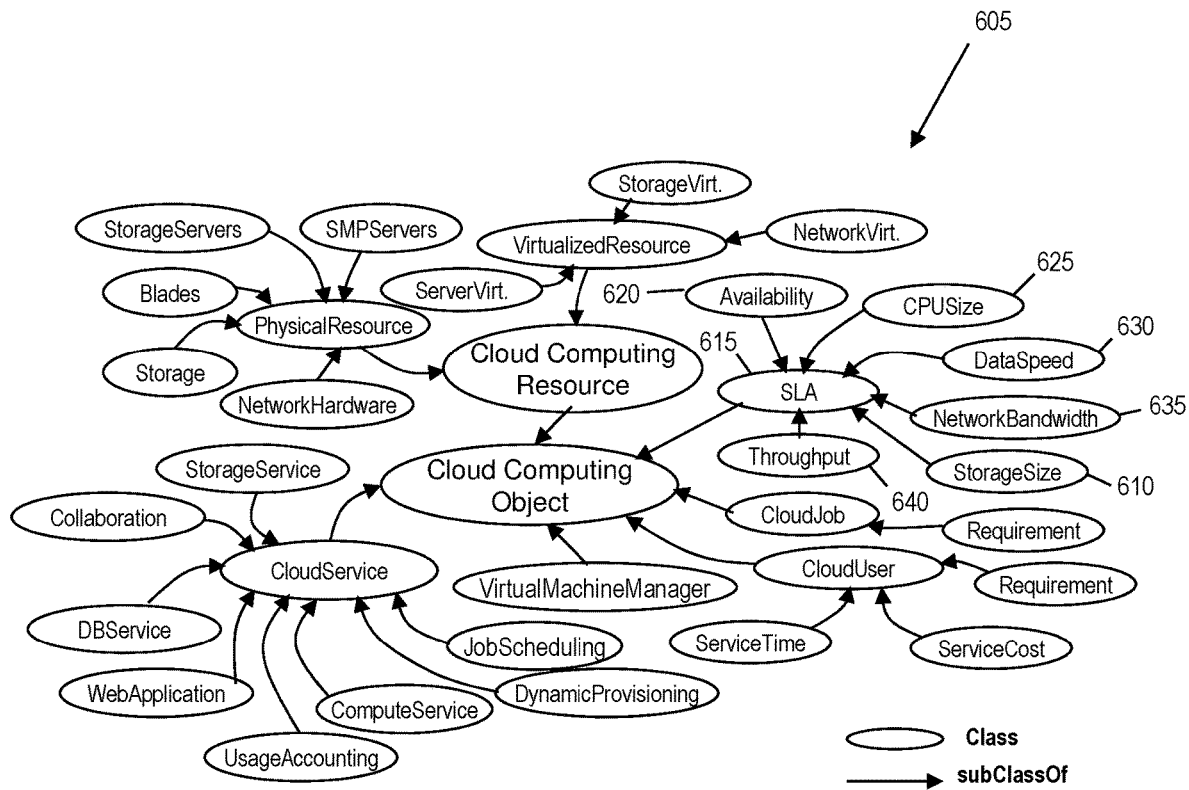
FIG. 6 shows an example of domain ontology data in accordance with aspects of the present invention.

FIG. 6 shows an example of domain ontology data 605 for one of the predefined cloud environments. The domain ontology data 605 defines relationships between resources in a cloud computing environment. The domain ontology data 605 may be included in the domain ontology data 280 of FIG. 2, which may include different respective domain ontology data for each of the predefined cloud environments. The domain ontology data may be publicly available and may be stored in the repository 240 (of FIG. 2), e.g., in an enterprise ontology/business glossary, or may be obtained from other public sources on the Internet in real-time on an as-needed basis by the architecture document conversion code 200.

In the example of FIG. 6, for each node in the graph 410 for which domain specific cloud environment information was identified (e.g., using the semantic understanding models), the architecture document conversion code 200 uses the domain ontology data 605 to determine additional cloud environment information, which may include related resources and classes such as a governing class of the domain specific cloud environment information. For example, if a node in the graph 410 is determined to have domain specific cloud environment information related to Storage Size (shown at 610), then the architecture document conversion code 200 would use the domain ontology data 605 to determine that SLA (shown at 615) is the governing class of Storage Size. In embodiments, the architecture document conversion code 200 validates that the adjacent nodes (i.e., adjacent to the node for which domain specific cloud environment information was identified) cover any additional related constraints and there is no exclusion. In embodiments, if an exclusion is found then the architecture document conversion code 200 suggests those as additions using the ontology data. For example, if a node in the graph 410 is determined to have domain specific cloud environment information related to Storage Size (shown at 610) and the architecture document conversion code 200 uses the domain ontology data 605 to determine that SLA (shown at 615) is the related to Storage Size, then the architecture document conversion code 200 checks adjacent nodes in the graph 410 to determine if any of these adjacent nodes have domain specific cloud environment information related to the subclasses of SLA as defined by the domain ontology data 605. In this example, the architecture document conversion code 200 determines whether any of the adjacent nodes were determined to have domain specific cloud environment information related to each of Availability (shown at 620), CPU Size (shown at 625), Data Speed (shown at 630), Network Bandwidth (shown at 635), and Throughput (shown at 640). Any of the subclasses not found at an adjacent node are deemed exclusions. In embodiments, the architecture document conversion code 200 tags the node with additional cloud environment information identifying the exclusions so that resources covering the exclusions can be included in the IaC and playbooks. In embodiments, if several exclusions are found (e.g., greater than a threshold amount), then the architecture document conversion code 200 defines that as a negative instance for historical training such that the system learns and improves over time.

In accordance with aspects of the invention, the architecture document conversion code 200 of the IaC server 220 creates a playbook 290 to build an automation pipeline. In embodiments, the architecture document conversion code 200 uses a finite state machine (FSM) to create the IaC document 260 based on the cloud environment information that is identified for each node in the graph 410 and based on additional cloud environment information determined using the domain ontology data. In embodiments, a sequence of steps of the FSM is triggered in action depending on what has been done and what needs to be done. In embodiments, the FSM creates the sequence of steps to ensure when one node of the graph 410 is completed and validated, then the system may move into the next node. In embodiments, when the next node is interdependent on the module itself, the FSM validates that the node has the correct linkage based on a context correlation engine running in the background. In embodiments, the workflow of the flowchart is taken as input from the user. The flowchart can be as simple as diagrams generated through group meetings by architects and engineers. In embodiments, using region-based segmentation and NLP based content understanding, the architecture document conversion code 200 invention generates a graph with relevant edges and vertices, which are mapped to the finite state machine configured as the next step which triggers the sequence of events.

In accordance with aspects of the invention, by marching through the nodes using the FSM, the architecture document conversion code 200 of the IaC server 220 creates the IaC document 260 based on the cloud environment information that is identified for each node in the graph 410 and based on additional cloud environment information determined using the domain ontology data. In one embodiment, the architecture document conversion code 200 uses one or more predefined mappings to select predefined code modules based on the identified cloud environment information and additional cloud environment information. In another embodiment, the architecture document conversion code 200 uses a machine learning model to select predefined code modules based on the collection of cloud environment information and additional cloud environment information. In this embodiment, the machine learning model is trained using historic build data 270 (of FIG. 2) that may include data defining successful and unsuccessful historic builds, including the cloud environment information, and additional cloud environment information, and code modules used in each build. The machine learning model may also be revised and retrained based on user feedback of the historic builds.

In both embodiments, the architecture document conversion code 200 adds the selected predefined code modules to the IaC document 260 for configuring the various cloud resources. In this manner, the code automatically creates the IaC document 260 for the cloud architecture document 250.

Figure 7:
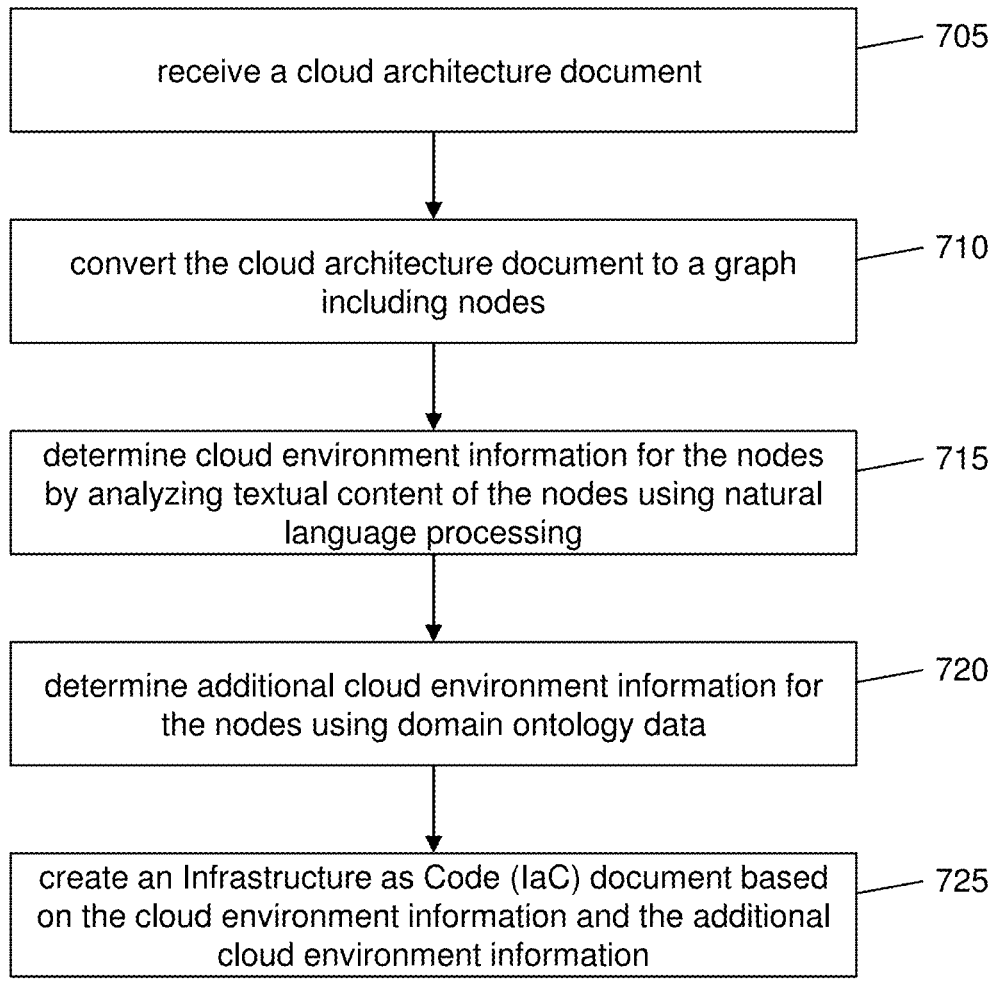
FIG. 7 shows a flowchart of an exemplary method in accordance with aspects of the present invention.

FIG. 7 shows a flowchart of an exemplary method in accordance with aspects of the present invention. Steps of the method may be carried out in the environment of FIG. 2 and are described with reference to elements depicted in FIG. 2.

At step 705, the system receives a cloud architecture document. In embodiments, and as described with respect to FIG. 2, the IaC server 220 receives a cloud architecture document 250 from a user device 210. The cloud architecture document may comprise a diagram with a visual representation of components in a cloud computing environment.

At step 710, the system converts the cloud architecture document to a graph including nodes. In embodiments, and as described with respect to FIGS. 2 and 4, the IaC server 220 converts the cloud architecture document 250 to a graph 410. The converting the cloud architecture document to the graph may comprise: converting the cloud architecture document to a flowchart; and converting the flowchart to the graph using region-based segmentation.

At step 715, the system determines cloud environment information for the nodes by analyzing textual content of the nodes using natural language processing. In embodiments, and as described with respect to FIGS. 2 and 5, the IaC server 220 analyzes the text of the nodes of the graph 410 using natural language processing techniques such as natural language understanding and semantic understanding models. The semantic understanding models may comprise domain specific models and domain general models that identify cloud environment information associated with cloud computing resources in a cloud domain ontology.

At step 720, the system determines additional cloud environment information for the nodes using domain ontology data. In embodiments, and as described with respect to FIGS. 2 and 6, the IaC server 220 determines additional cloud computing resources based on relationships defined in domain ontology data. In embodiments, the domain ontology data defines relationships between resources in a cloud computing environment.

At step 725, the system creates an Infrastructure as Code (IaC) document based on the cloud environment information and the additional cloud environment information. In embodiments, and as described with respect to FIG. 2, the IaC server 220 creates an IaC document by selecting modules of code based on the cloud environment information and the additional cloud environment information. In embodiments, the creating the IaC document comprises selecting predefined code modules using a machine learning model with the cloud environment information and the additional cloud environment information. In embodiments, the IaC document comprises machine-readable code that is executable to provision resources in a cloud computing environment according to the cloud architecture document. In embodiments, the method further comprises creating a playbook based on the IaC document. The IaC document, once created, can be executed in the cloud computing environment to automatically provision cloud resources in the cloud computing environment according to a plan set forth in the cloud architecture document.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    receiving, by a processor set, a cloud architecture document;
    converting, by the processor set, the cloud architecture document to a graph including nodes;
    determining, by the processor set, cloud environment information for the nodes by analyzing textual content of the nodes using natural language processing;
    determining, by the processor set, additional cloud environment information for the nodes using domain ontology data; and
    creating, by the processor set, an Infrastructure as Code (IaC) document based on the cloud environment information and the additional cloud environment information.

2. The method of claim 1, wherein the cloud architecture document comprises a diagram with a visual representation of components in a cloud computing environment.

3. The method of claim 1, wherein the IaC document comprises machine-readable code that is executable to provision resources in a cloud computing environment according to the cloud architecture document.

4. The method of claim 1, wherein the converting the cloud architecture document to the graph comprises:
    converting the cloud architecture document to a flowchart; and
    converting the flowchart to the graph using region-based segmentation.

5. The method of claim 1, wherein the analyzing the textual content of the nodes using natural language processing comprises analyzing the textual content using semantic understanding models.

6. The method of claim 5, wherein the semantic understanding models comprise domain specific models and domain general models.

7. The method of claim 1, wherein the domain ontology data defines relationships between resources in a cloud computing environment.

8. The method of claim 1, wherein the creating the IaC document comprises selecting predefined code modules using a machine learning model with the cloud environment information and the additional cloud environment information.

9. The method of claim 1, further comprising creating a playbook based on the IaC document.

10. A computer program product comprising one or more computer readable storage media having program instructions collectively stored on the one or more computer readable storage media, the program instructions executable to:
receive a cloud architecture document comprising a diagram with a visual representation of components in a cloud computing environment;
convert the cloud architecture document to a graph including nodes;
determine cloud environment information for the nodes by analyzing textual content of the nodes using natural language processing;
determine additional cloud environment information for the nodes using domain ontology data; and
create an Infrastructure as Code (IaC) document based on the cloud environment information and the additional cloud environment information, wherein the IaC document comprises machine-readable code that is executable to provision resources in the cloud computing environment according to the cloud architecture document.

11. The computer program product of claim 10, wherein the converting the cloud architecture document to the graph comprises:
converting the cloud architecture document to a flowchart; and
converting the flowchart to the graph using region-based segmentation.

12. The computer program product of claim 10, wherein the analyzing the textual content of the nodes using natural language processing comprises analyzing the textual content using semantic understanding models.

13. The computer program product of claim 10, wherein the domain ontology data defines relationships between resources in a cloud computing environment.

14. The computer program product of claim 10, wherein the creating the IaC document comprises selecting predefined code modules using a machine learning model with the cloud environment information and the additional cloud environment information.

15. The computer program product of claim 10, wherein the program instructions are executable to create a playbook based on the IaC document.

16. A system comprising:
a processor set, one or more computer readable storage media, and program instructions collectively stored on the one or more computer readable storage media, the program instructions executable to:
receive a cloud architecture document comprising a diagram with a visual representation of components in a cloud computing environment;
convert the cloud architecture document to a graph including nodes;
determine cloud environment information for the nodes by analyzing textual content of the nodes using natural language processing;
determine additional cloud environment information for the nodes using domain ontology data;
create an Infrastructure as Code (IaC) document based on the cloud environment information and the additional cloud environment information, wherein the IaC document comprises machine-readable code that is executable to provision resources in the cloud computing environment according to the cloud architecture document; and
create a playbook based on the IaC document.

17. The system of claim 16, wherein the converting the cloud architecture document to the graph comprises:
converting the cloud architecture document to a flowchart; and
converting the flowchart to the graph using region-based segmentation.

18. The system of claim 16, wherein the analyzing the textual content of the nodes using natural language processing comprises analyzing the textual content using semantic understanding models.

19. The system of claim 16, wherein the domain ontology data defines relationships between resources in a cloud computing environment.

20. The system of claim 16, wherein the creating the IaC document comprises selecting predefined code modules using a machine learning model with the cloud environment information and the additional cloud environment information.

* * * * *